UNITED STATES PATENT OFFICE.

JACOB VAN NORMAN, OF EASTON, PENNSYLVANIA, ASSIGNOR OF FOUR-FIFTHS TO CYRUS Q. GULDIN, OF POTTSTOWN, MILLER M. DEEM AND MORRIS C. J. STUPP, OF READING, AND NICHOLAS H. LARZELERE, OF NORRISTOWN, PENNSYLVANIA; AMANDA R. VAN NORMAN ADMINISTRATRIX OF SAID JACOB VAN NORMAN, DECEASED.

MANUFACTURE OF CARBURETED-AIR GAS.

SPECIFICATION forming part of Letters Patent No. 579,415, dated March 23, 1897.

Application filed February 10, 1896. Serial No. 578,684. (No specimens.)

*To all whom it may concern:*

Be it known that I, JACOB VAN NORMAN, a citizen of the United States, residing at Easton, in the county of Northampton, State of Pennsylvania, have invented certain new and useful Improvements in the Manufacture of Carbureted-Air Gas, of which the following is a full, clear, and exact description, reference being had to the accompanying drawings, forming a part of this specification.

My invention relates to the production of a combustible gas from liquid hydrocarbons for illuminating and heating purposes; and it consists in a novel composition of matter from which such gas may be manufactured by any well-known air-carbureting apparatus and in the resultant inflammable gas produced from such new composition of elements.

The object of my invention is the production of combustible carbureted air in which there shall exist a minimum percentage of etherized hydrocarbon in order that the flame of combustion shall not only possess the maximum of illuminating power, but shall be capable of completely consuming all the carbon present in the burning vapor.

In the manufacture of carbureted air as commonly practiced by means of several well-known forms of air-gas machines the combustible vapor is produced by the passing of a current of air under pressure over a body of common gasolene or naphtha in a closed vessel without the presence of any other element in the vessel, the combustible gas being formed by the etherization of a portion of the liquid hydrocarbon combining with the air, and for this purpose the lighter gasolenes, say of 0.650 specific gravity or 80° to 85° Baumé, are usually employed. At a temperature of 65° to 70° Fahrenheit the air-current will take up an excess of etherized hydrocarbon. For illustration, such air-gas produced from gasolene of the specific gravity mentioned and at or about the temperature stated will show on analysis fifteen per cent. of paraffin hydrocarbons, 0.5 per cent. of olefin, 16.9 per cent. of oxygen, and 67.6 per cent. of nitrogen.

This gas tested for illuminating purposes, say in an ordinary Welsbach burner, will give a smoky flame, showing the presence of unconsumed carbon, and it will be impossible to obtain therefrom the maximum of illumination without an excess of luminous hydrocarbon flame, rendering the use of the gas dangerous and ill-adapted for domestic indoor purposes.

In the manufacture of my improved air-gas and of the composition of matter from which it is produced I employ any well-known form of carbureter, but preferably the form of improved apparatus invented by me and for which I have filed application for Letters Patent contemporaneously with this application.

My new composition of matter is formed by the admixture with commercial gasolene or naphtha of 70° Baumé, which has a specific gravity of 0.700, of sulfuric ether in the proportion of one fluid ounce of the latter to one gallon of the former. These proportions may be varied slightly without appreciably affecting the result obtained, and the lighter gasolene usually used may be employed without changing the nature of the combustible vapor derived from the compound except in degree of illuminating power. As a guide to the proportions of gasolene and sulfuric ether proper to be used to produce the best results I have stated the minimum quantity of sulfuric ether to one gallon of naphtha in order to produce any appreciable result. Hence the quantity of sulfuric ether may be increased.

If a lesser proportion of sulfuric ether be used with a lighter gasolene, say 60° specific gravity, the effect will be to make a gas giving off greater heat in its combustion, but with lessened illuminating power. If a greater proportion than one ounce of sulfuric ether be used, say two ounces to one gallon of naphtha of greater specific gravity, say 88° specific gravity, very excellent results will be obtained. In fact, the pure sulfuric ether alone will give a light of very good power, but is too expensive for such use. Its effect in the combination or admixture with naphtha is to modify or affect the etherization of the former and the resultant vapor in this employment of it, though the reason I am unable to state. The result, however, is to increase the brilliancy and illuminating power of the etherized vapor, and, in my opinion, its effect is to absorb to some extent or perhaps neutralize the carbonaceous matter and hence clarify the flame and produce a whiter light. In stating the proportions as one gallon of naphtha of 70° specific gravity to one fluid ounce of sulfuric ether these figures and proportions are given as the result of my experience in obtaining from the new compound a carbureted-air gas of the maximum illuminating power without an excess of carbon and hence free from liability to smoke when burned. The analysis of my new carbureted-air gas made from these ingredients of the specific gravity and in the proportions last named and at a temperature of 68° Fahrenheit will show as follows: paraffin hydrocarbons, 11.6 per cent.; olefin hydrocarbons, 0.4 per cent.; oxygen, 17.2 per cent.; nitrogen, 68.8; methane, 2.0 per cent.

If the ether is of full strength and purity, it should be perfectly miscible with the naphtha in all proportions, though I am of the opinion that no chemical reaction takes place, nor anything but a perfect admixture. Commercial sulfuric ether may be used, and should it hold any water the only effect will be to make a cloudy mixture with the naphtha due to the separation of the water. Hence an increased proportion of sulfuric ether in such case will produce equally good results from the compound.

Of course it is well understood in the art that the temperature at the carbureting apparatus will effect the quantity of naphtha-vapor which the air is capable of taking up. For instance, it is said that of gasolene of 0.65° specific gravity air will take up 5.7 per cent. at 14° Fahrenheit and 10.7 per cent. at 32° Fahrenheit, 17.5 per cent. at 50° Fahrenheit, and twenty-seven per cent. at 68° Fahrenheit. In this connection it is to be remarked that the quantity of etherized carbon thus stated to be taken up at the temperature of 68° Fahrenheit from naphtha of 65° specific gravity—80° to 85° Baumé—is very nearly double the quantity—viz., fourteen per cent.—taken up in the use of my new compound at the same temperature with the ingredients—70° specific gravity naphtha—united with sulfuric ether in the proportion of one gallon of the former to one fluid ounce of the latter. It must also be understood that when I speak of gasolene or naphtha I include all the known volatile oils obtained from petroleum.

Having thus described my invention, what I claim as new, and desire to secure by Letters Patent, is—

1. A new compound for the production of carbureted-air gas, consisting of the admixture, with the volatile oils of petroleum, of sulfuric ether, in or about the proportions stated; substantially as set forth.

2. The process or method in the manufacture of carbureted-air gas from volatile oils of petroleum, of absorbing or neutralizing the excess of etherized carbon, by the admixture with the naphtha, in the carbureting apparatus, of sulfuric ether, in or about the proportions set forth.

3. A combustible carbureted-air gas of the composition specified and obtained by passing a current of air in contact with a compound of naphtha and sulfuric ether in a suitable carbureting device, substantially as set forth.

In testimony whereof I have hereunto affixed my signature this 8th day of February, A. D. 1896.

JACOB VAN NORMAN.

Witnesses:
M. C. J. STUPP,
C. Q. GULDIN.